US010875518B2

(12) United States Patent
Kluge et al.

(10) Patent No.: US 10,875,518 B2
(45) Date of Patent: Dec. 29, 2020

(54) COMBINED MULTISTAGE HYBRID TRANSMISSION AND POWERTRAIN COMPRISING SAME

(71) Applicant: Bayerische Motoren Werke Aktiengesellschaft, Munich (DE)

(72) Inventors: Benjamin Kluge, Munich (DE);
Sebastian Liebert, Unterfoehring (DE);
Ulrich Ohnemus, Hattenhofen (DE);
Fritz Pobitzer, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/524,353

(22) Filed: Jul. 29, 2019

(65) Prior Publication Data

US 2019/0344772 A1    Nov. 14, 2019

Related U.S. Application Data

(63) Continuation of application No. PCT/EP2018/056376, filed on Mar. 14, 2018.

(30) Foreign Application Priority Data

Mar. 24, 2017   (DE) .................. 10 2017 204 970

(51) Int. Cl.
*B60W 10/113* (2012.01)
*B60K 6/365* (2007.10)
(Continued)

(52) U.S. Cl.
CPC .......... *B60W 10/113* (2013.01); *B60K 6/365* (2013.01); *B60W 10/02* (2013.01); *F16H 3/666* (2013.01); *Y02T 10/62* (2013.01)

(58) Field of Classification Search
None
See application file for complete search history.

(56) References Cited

U.S. PATENT DOCUMENTS

| 5,730,676 A | 3/1998 | Schmidt |
| 8,353,803 B2 * | 1/2013 | Saitoh ................... F16H 3/666 |
| | | 475/302 |

(Continued)

FOREIGN PATENT DOCUMENTS

| DE | 10 2012 207 099 A1 | 10/2013 |
| DE | 10 2012 220 517 A1 | 5/2014 |
| WO | WO 2013/159994 A1 | 10/2013 |

OTHER PUBLICATIONS

International Search Report (PCT/ISA/210) issued in PCT Application No. PCT/EP2018/056376 dated May 8, 2018 with English translation (five pages).

(Continued)

*Primary Examiner* — Dirk Wright
(74) *Attorney, Agent, or Firm* — Crowell & Moring LLP

(57) ABSTRACT

A combined multistage hybrid transmission has a transmission housing; a transmission input shaft; a transmission output shaft; a first planetary gear set with a first sun pinion, a first ring gear, and a first carrier shaft on which at least one first planetary gear is rotatably mounted; a second planetary gear set with a second sun pinion, a second ring gear, and a second carrier shaft on which at least one second planetary gear is rotatably mounted. An electromechanical energy converter is rotationally fixed to the first sun pinion, wherein the first ring gear is rotationally fixed to the second sun pinion by an intermediate shaft. The transmission output shaft is arranged axially parallel and at a radial distance to the transmission input shaft. The drive power can be transmitted from the transmission input shaft by a first spur gear stage with a first transmission input spur gear and a first (Continued)

transmission output spur gear and by a second spur gear stage with a second transmission input spur gear and a second transmission output spur gear. The two transmission output spur gears are concentric to the transmission output shaft and the two transmission input spur gears are concentric to the transmission input shaft. The first transmission input spur gear is or can be rotationally fixed to the intermediate shaft, and the second transmission input spur gear is or can be rotationally fixed to the second ring gear.

13 Claims, 4 Drawing Sheets

(51) Int. Cl.
*B60W 10/02* (2006.01)
*F16H 3/66* (2006.01)

(56) References Cited

U.S. PATENT DOCUMENTS

| | | | |
|---|---|---|---|
| 9,387,752 B2 * | 7/2016 | Puiu | B60K 6/445 |
| 9,506,531 B2 * | 11/2016 | Beck | F16H 3/66 |
| 9,829,074 B2 * | 11/2017 | Beck | F16H 3/66 |
| 2015/0080164 A1 | 3/2015 | Beck | |

OTHER PUBLICATIONS

German-language Written Opinion (PCT/ISA/237) issued in PCT Application No. PCT/EP2018/056376 dated May 8, 2018 (seven pages).

German-language Office Action issued in counterpart German Application No. 10 2017 204 970.7 dated Dec. 14, 2017 (six pages).

* cited by examiner

| Gear | B04 | K15 | K35 | K38, K210 | K17, K27, K220 |
|---|---|---|---|---|---|
| 1. |  | X | X | X |  |
| 2. | X | X |  | X |  |
| 3. |  | X |  | X | X |
| 4. | X | X |  |  | X |
| 5. |  | X | X |  | X |
| 6. | X |  | X |  | X |

Fig. 7

COMBINED MULTISTAGE HYBRID TRANSMISSION AND POWERTRAIN COMPRISING SAME

CROSS REFERENCE TO RELATED APPLICATIONS

This application is a continuation of PCT International Application No. PCT/EP2018/056376, filed Mar. 14, 2018, which claims priority under 35 U.S.C. § 119 from German Patent Application No. 10 2017 204 970.7, filed Mar. 24, 2017, the entire disclosures of which are herein expressly incorporated by reference.

BACKGROUND AND SUMMARY OF THE INVENTION

The invention relates to a motor vehicle transmission with two planetary gear sets. Such transmissions are also known in the prior art, especially from DE 10 2012 220 517 A1.

The invention shall be described in the following with the aid of a hybrid power train for a passenger car, but this should not be considered to be a limitation of the invention.

Current hybrid transmissions are generally based on conventional automatic transmissions which are designed for a pure combustion engine power train. For a hybridization, an electromechanical energy converter is additionally integrated into the already limited design space. This may have the disadvantage that, due to the limited design space, usually only a limited electrification can be achieved, especially in regard to the electrically producible drive power, i.e., only relatively low traction/driving performance is possible through the purely electrical traction drive. Furthermore, such a traditional automatic transmission which has been modified into a hybrid transmission is not designed specifically for a hybrid power train.

DE 10 2012 220 517 A1 proposes an automatic transmission for a motor vehicle with two planetary gear sets and two spur gear stages. In this automatic transmission, the transmission ratio between the input shaft and the output shaft, which are arranged axially parallel and radially spaced apart from each other, can be changed in discrete stages (gears).

One problem which the invention proposes to solve is to indicate a combined multistage transmission, which can be shifted in discrete stages with regard to the transmission ratio, for a hybrid drive with low space requirement. This problem is solved by a multistage hybrid transmission and by a hybrid power train according to the claimed invention.

In the sense of the invention, a combined multistage hybrid transmission means a speed changing transmission comprising a transmission input shaft to receive a drive power from a drive machine, preferably a combustion engine, and especially a combustion engine of reciprocating piston design. Further, this transmission has a transmission output shaft, which can be coupled to deliver the received drive power in the direction of one or preferably several powered motor vehicle axles with one or more powered wheels to transmit the drive power to the roadway surface. Preferably, such a powered vehicle axle is designed as a front axle and especially as a rear axle, in particular so-called all-wheel motor vehicles have both a powered front and rear axle.

Preferably, the multistage hybrid transmission is configured as a shiftable transmission and the drive power can preferably be transmitted in different, preferably discrete transmission ratios from the transmission input shaft to the transmission output shaft. In particular, the combined multistage hybrid transmission is intended for use by the front/transverse working principle (front engine, transverse to the driving direction). Preferably, therefore, the transmission input shaft and the transmission output shaft are arranged radially spaced apart from each other and axially parallel to each other, in particular, a good utilization of space can be achieved by this arrangement.

The shiftable transmission ratios are to be understood in particular as so-called gears or as so-called shift stages.

Moreover, the combined multistage hybrid transmission comprises a transmission housing. This transmission housing is designed in particular for the rotatable mounting of the transmission input shaft and the transmission output shaft.

In the sense of the invention, a planetary gear set means an epicyclic gear set comprising a sun pinion, a ring gear and a planetary gear, which is mounted rotatably on a carrier shaft. Preferably, the planetary gear set comprises a plurality of planetary gears. The planetary gear meshes in particular with both the ring gear and the sun pinion. Such an epicyclic gear set is known in the prior art as a so-called minus gear set.

Preferably, the epicyclic gear set comprises a planetary gear and a plus planet wheel, preferably a plurality of such planetary gears and plus planet wheels, each mounted rotatably on the carrier shaft and meshing with each other. In particular, the planetary gear meshes with the sun pinion and the plus planet wheel meshes with the ring gear. Such an epicyclic gear set is known in the prior art as a so-called plus gear set or plus planetary gear set.

The combined multistage hybrid transmission comprises two such planetary gear sets, which are combined with two spur gear stages. Accordingly, the first planetary gear set has a first sun pinion, a first ring gear and a first carrier shaft on which a planetary gear or planetary gears are rotatably mounted. The second planetary gear set has a second sun pinion, a second ring gear and a second carrier shaft on which a planetary gear or planetary gears are rotatably mounted.

Preferably, these two planetary gear sets are arranged concentrically to each other, especially concentrically with respect to a common central axis, and further preferably these two planetary gear sets are axially spaced apart from each other along this central axis.

Preferably, the first of these planetary gear sets is arranged geometrically adjacent to the transmission input shaft and further the first planetary gear set is arranged geometrically before the second planetary gear set in regard to the transmission input shaft. In particular, with such an arrangement of the planetary gear sets, a combined multistage hybrid transmission with little space requirement can be produced.

Preferably, the two planetary gear sets are designed as so-called plus wheel sets, in particular the two planetary gear sets are designed as so-called minus wheel sets and especially particularly one of the planetary gear sets is designed as a so-called plus wheel set and the other planetary gear set is designed as a so-called minus wheel set.

In one preferred embodiment of the invention, the transmission input shaft is selectively connectible in a rotationally fixed manner to the first carrier shaft by means of a selectively shiftable coupling, especially by means of a first coupling. In particular, the selective connection makes possible and preferably selectively controls the power transmission from the transmission input shaft to the first planetary gear set. In a further preferred embodiment, the transmission input shaft is connected in a rotationally fixed manner to the first carrier shaft.

Further preferably, the transmission input shaft is connected or is selectively connectible in a rotationally fixed manner to the second carrier shaft, i.e., the carrier shaft of the second planetary gear set. In one preferred embodiment of the invention, the transmission input shaft is selectively connectible in a rotationally fixed manner to the second carrier shaft by means of a selectively shiftable coupling, especially by means of a second coupling. In particular, this connection makes possible the power transmission from the transmission input shaft to the second planetary gear set, especially in a selective manner.

In the sense of the invention, a rotationally fixed connection means that, when torque is transmitted from a first component to a second component, the second component has the same rotary speed as the first component, to which it is rotationally fixed. Preferably, rotationally fixed components contact each other directly or are joined together indirectly by means of a shaft to shaft arrangement and thus with no rotary speed difference in the power transmission. Preferably, for the selectively rotationally fixed connection of the two components there is arranged between them (in terms of the power transmission) a selectively shiftable torque transmission arrangement, preferably a brake, especially a coupling. By means of such a torque transmission arrangement, the possibility of selectively connecting the two components in a rotationally fixed manner is created.

In the sense of the invention, a selective connection of two components means that such a connection can be produced and broken once more at will for the torque transmission. Preferably, a torque transmission arrangement of the aforementioned kind, or a shifting element, is provided for the producing of such a selective connection.

Preferably, a torque transmission arrangement means an arrangement for the selective producing of a torque-conducting connection, preferably therefore a selectively shiftable coupling or a selectively shiftable brake. In the sense of the invention, such a coupling also means a synchronizing, preferably a single or multiple cone synchronizing, as is familiar from shiftable transmissions in automotive engineering. In particular, with a coupling two rotatably mounted components can be selectively joined together; with a brake, in particular, one rotatably mounted component and one permanently stationary component, especially the transmission housing, can be selectively joined together. Preferably, such a torque transmission arrangement is designed as a form-fitting or friction-locking and preferably as a frictional form-fitting arrangement. In particular, the aforementioned synchronizations are to be understood as a frictional form-fitting arrangement.

In particular by means of such selectively shiftable connections, the combined multistage hybrid transmission can be shifted into various states, in particular various transmission stages and especially various operating states for power transmission. In particular, friction-locking torque transmission arrangements have proven to work well as controllable arrangements for this purpose, by which a torque can be transmitted between components even when these components are not yet in synchronism (having the same rotary speed of the components being coupled together). In particular, form-fitting torque transmission arrangements have proven to be especially advantageous for the transmission of large torques in a small design space, as compared to friction-locking torque transmission arrangements.

Preferably, rotationally fixed components have the same axis of rotation during the power transmission. Especially in the special case of a rotationally fixed connection of a component with the transmission housing (the transmission housing is stationary), this component connected to the transmission housing is assigned a rotary speed of zero, thus the component connected to the transmission housing is standing still and no power transmission is possible.

Preferably, the first sun pinion, i.e., the sun pinion of the first planetary gear set, is selectively connectible in a rotationally fixed manner by a brake to the transmission housing. By means of this configuration, it is thus possible to assign a rotary speed of zero for the first sun pinion in the case of the connection to the transmission housing. In particular, owing to this connection, the transmission ratio between the transmission input shaft and the transmission output shaft can be changed in a simple manner.

In another embodiment of the invention, the first sun pinion is connected in a rotationally fixed manner to the transmission housing and in a further preferred embodiment of the invention the first sun pinion is mounted free-turning with respect to the transmission housing and a brake is provided for the selective connection of the first sun pinion to the transmission housing.

Further preferably, at least one of the two ring gears (the ring gear of the first planetary gear set, the ring gear of the second planetary gear set) is selectively connectible in a rotationally fixed manner by means of a brake to the transmission housing and preferably the first ring gear is selectively connectible in a rotationally fixed manner by means of a brake to the transmission housing, especially in the event that the first carrier shaft is rotationally fixed to the transmission input shaft.

Further preferably, the first sun pinion is mounted rotatably with respect to the transmission housing and in particular it is not selectively connectible in a rotationally fixed manner to it. In particular, by replacing the selectively rotationally fixed connection of the first carrier shaft to the transmission input shaft by a "non-selective", i.e., a permanently rotationally fixed connection, or by omission of the selectively rotationally fixed connection between the first sun pinion and the transmission housing, firstly the number of shiftable transmission stages of the combined multistage hybrid transmission is reduced, and secondly its construction is simplified and thus an especially simple multistage hybrid transmission can be produced.

Further preferably, the first and second planetary gear sets have the same stationary transmission ratio. Preferably, the two planetary gear sets have identical components, especially in regard to intermeshing components (sun pinion, ring gear, planetary gear). In particular, the same stationary transmission ratios of the planetary gear sets make it possible to use a large number of identical parts for the planetary gear sets. This is possible in particular for the proposed transmission topology, since the two planetary gear sets and the two spur gear stages are coupled together, or can be selectively coupled together in such a way that a large number of different transmission stages can be produced with them and the stage jumps between these transmission stages are favorable for the powering of a motor vehicle.

Preferably, the transmission input shaft is designed for the selective rotationally fixed connection to an internal combustion engine and the transmission output shaft is preferably designed to deliver power in the direction of a powered vehicle axle.

In one preferred embodiment of the invention, two transmission elements of the first planetary gear set can be connected in a rotationally fixed manner to each other by a coupling, this coupling being understood here as being a fourth coupling. Preferably, the fourth coupling is designed as a selectively shiftable coupling. By the "transmission elements of the first planetary gear set" is meant in particular the first sun pinion, the first ring gear and the first carrier shaft. In a further preferred embodiment of the invention, no such fourth coupling is provided and therefore the first carrier shaft and the first ring gear are preferably not interconnectible. In particular, the selectively rotationally fixed connection of two of these transmission elements to each other, preferably the first ring gear and the first carrier shaft, enables a power transmission by means of the first planetary gear set with no rolling power losses.

In one preferred embodiment of the invention, the first carrier shaft is connectible in a rotationally fixed manner by a first coupling to the transmission input shaft. Preferably, this first coupling is designed as a selectively shiftable coupling. In particular, by means of this first coupling, firstly the transmission ratio of the multistage hybrid transmission can be influenced in a simple manner and furthermore especially low-loss driving power can be transmitted from the transmission input shaft to the first planetary gear set.

In one preferred embodiment of the invention, the second ring gear is selectively connectible in a rotationally fixed manner by a third coupling to the second transmission input spur gear. Preferably, this third coupling is designed as a selectively shiftable coupling. In particular, by means of such a third coupling, an especially easy transmission of traction power is possible from the second planetary gear set across the second spur gear stage to the transmission output shaft.

In one preferred embodiment of the invention, the second ring gear is rotationally fixed to the second transmission input spur gear. In particular, by means of such a permanent rotationally fixed connection of the second ring gear to the second transmission input spur gear, a simple possibility is created for the power transmission from the second planetary gear set across the second ring gear and the second spur gear stage to the transmission output shaft.

In one preferred embodiment of the invention, the second carrier shaft is connectible in a rotationally fixed manner by a second coupling to the transmission input shaft. Preferably, this second coupling is designed as a selectively shiftable coupling. In particular, by means of this second coupling, a simple possibility is created for transmitting power from the transmission input shaft and thus from a first traction machine with few losses to the second planetary gear set.

In one preferred embodiment of the invention, the second carrier shaft is permanently rotationally fixed to the transmission input shaft. In particular, an especially simple design of the multistage hybrid transmission is made possible with such a permanent rotationally fixed connection.

Preferably, the combined multistage hybrid transmission comprises precisely five torque transmission arrangements for the producing of six forward gears, four of which are designed as a coupling and one as a brake. In particular, with such a configuration, a large number of gears can be produced with relatively little expense. In one preferred embodiment of the invention, in which fewer than six forward gears are produced with the multistage hybrid transmission, fewer than precisely five torque transmission arrangements are provided. In particular, studies have shown that a fewer number of shiftable gears is adequate when there is a high degree of electrification, i.e., when the electromechanical energy converter is also designed to provide greater traction power.

In one preferred embodiment, the transmission output shaft is connected in a rotationally fixed manner to the first transmission output spur gear. Further preferably, the transmission input spur gear is selectively connectible in a rotationally fixed manner by a fifth coupling to the intermediate shaft. In particular, by means of such a layout of the combined multistage hybrid transmission an especially space-saving layout of this transmission is possible.

In one preferred embodiment of the invention, the first transmission output spur gear is selectively connectible in a rotationally fixed manner to the transmission output shaft by means of a sixth coupling and further in such a case the first transmission input spur gear is rotationally fixed to the intermediate shaft. In particular, by means of such a configuration of the combined multistage hybrid transmission an especially simple layout is possible in the area of the first and second planetary gear set.

In one preferred embodiment of the invention, the second transmission output spur gear is rotationally fixed to the transmission output shaft. In particular, by means of such a configuration of the combined multistage hybrid transmission an especially simple layout is produced in the area of the transmission output shaft.

In one preferred embodiment of the invention, especially in a case when the second transmission output spur gear is rotationally fixed to the transmission output shaft, only one of the two following mentioned selectively shiftable couplings is present. The one of these two couplings is a so-called second coupling and it is designed such that the second carrier shaft is selectively connectible in a rotationally fixed manner by this second coupling to the transmission input shaft. The other of these two couplings is a so-called third coupling and it is designed such that the second transmission input spur gear is selectively connectible in a rotationally fixed manner to the second ring gear by this third coupling. In particular, by means of such a layout of the combined multistage hybrid transmission a large number of different transmission stages is selectively switchable, while at the same time having a simple layout of this transmission.

Preferably, in particular in the case when the second transmission output spur gear is selectively connectible in a rotationally fixed manner to the transmission output shaft, the second carrier shaft is rotationally fixed to the transmission input shaft or preferably the second ring gear is rotationally fixed to the second transmission input spur gear or especially preferably both the second carrier shaft is rotationally fixed to the transmission input shaft and the second ring gear is rotationally fixed to the second transmission input spur gear.

In one preferred embodiment, the second transmission output spur gear is selectively connectible in a rotationally fixed manner to the transmission output shaft and preferably in such a case both the second carrier shaft is rotationally fixed to the transmission input shaft and the second ring gear is rotationally fixed to the second transmission input spur gear.

In one preferred embodiment of the invention, the second transmission output spur gear is rotationally fixed to the transmission output shaft and the combined multistage hybrid transmission comprises the second coupling (selective rotationally fixed connectibility of transmission input shaft and second carrier shaft) and the second transmission input spur gear is rotationally fixed to the second ring gear.

In one preferred embodiment of the invention, the second transmission output spur gear is rotationally fixed to the transmission output shaft and the combined multistage hybrid transmission comprises the third coupling (selective rotationally fixed connectibility of the second transmission input spur gear to the second ring gear) and the second carrier shaft is rotationally fixed to the transmission input shaft.

In one preferred embodiment of the invention, the combined multistage hybrid transmission has a so-called seventh coupling. Preferably, this seventh coupling is designed such that the second transmission output spur gear is selectively connectible in a rotationally fixed manner by means of it to the transmission output shaft. Further preferably, the second transmission input spur gear is rotationally fixed to the second ring gear. In particular, by means of such a configuration of the combined multistage hybrid transmission, an especially simple layout of this transmission is achieved in the area of the two planetary gear sets.

In one preferred embodiment of the invention, this comprises at least one sixth or one seventh coupling, or both. Preferably, at least one of these two couplings is designed as a frictional form-fitting coupling, in particular a so-called synchronization. Preferably, these two couplings are designed as a frictional form-fitting coupling. Studies have shown that the use of frictional form-fitting couplings is especially advantageous in the area of the transmission output shaft, since firstly speed differentials need to be canceled out at this place when switching from one transmission stage to another, and secondly large torques need to be transmitted.

In one preferred embodiment of the invention, the second carrier shaft is permanently rotationally fixed to the transmission input shaft. In particular, by means of such a configuration an especially simple layout of the combined multistage hybrid transmission is achieved in the area of the second planetary gear set.

Preferably, two groups of couplings are provided, wherein the combined multistage hybrid transmission each time comprises a single coupling from each of the two groups. The first group of couplings comprises the fifth coupling and the sixth coupling, and the second group comprises the second, third and seventh coupling. Preferably, the first group of couplings is associated with the first spur gear stage and the second group of couplings is associated with the second spur gear stage. In particular, by "associated" is meant that, by opening the coupling (with the coupling opened, no torque can be transmitted by it), no torque can be transmitted to the transmission output shaft by the spur gear stage associated with the opened coupling. In particular, by means of such a configuration of the combined multistage hybrid transmission it is possible that precisely three torque transmission arrangements are closed for the formation of each gear and each time only one torque transmission arrangement is opened and another one must be closed for the shifting to an adjacent gear (from n to n+1 or n−1), and thus a good controllability of the gear shifting is achieved.

Further, a power train for a hybrid vehicle is proposed, the previously described multistage hybrid transmission being used in this power train. Further, this power train comprises an internal combustion engine, which is designed to provide a traction power in order to overcome driving resistances of the hybrid vehicle. This traction power of the internal combustion engine is preferably transmissible to the transmission input shaft. Preferably, the internal combustion engine is connected or can be connected in a rotationally fixed manner to the transmission input shaft. Further, the power train comprises a drive train, by which is preferably meant a mechanism for transmission of power from this multistage hybrid transmission to at least one powered wheel of the hybrid vehicle. Preferably this powered wheel is designed as a wheel and tire combination, which is designed to transmit power from this drive train to a roadway surface. Preferably, the transmission output shaft is connected at least temporarily or permanently to the drive train. Studies have shown that, with such a drive train, it is possible to provide a drive train having a relatively simple layout and a relatively high efficiency as compared to the drive trains known in the prior art.

Preferably, the proposed drive train is especially suitable for a so-called front/transverse drive architecture and is designed for this. By such a drive architecture is meant in particular the arrangement of the internal combustion engine transversely to the driving direction with multistage hybrid transmission connected directly to it. Such an arrangement of the drive train is generally known as a front/transverse drive in the prior art, especially in the case of so-called compact vehicles.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 is a shifting diagram for a multistage hybrid transmission.

DETAILED DESCRIPTION OF THE DRAWINGS

Figure 1:
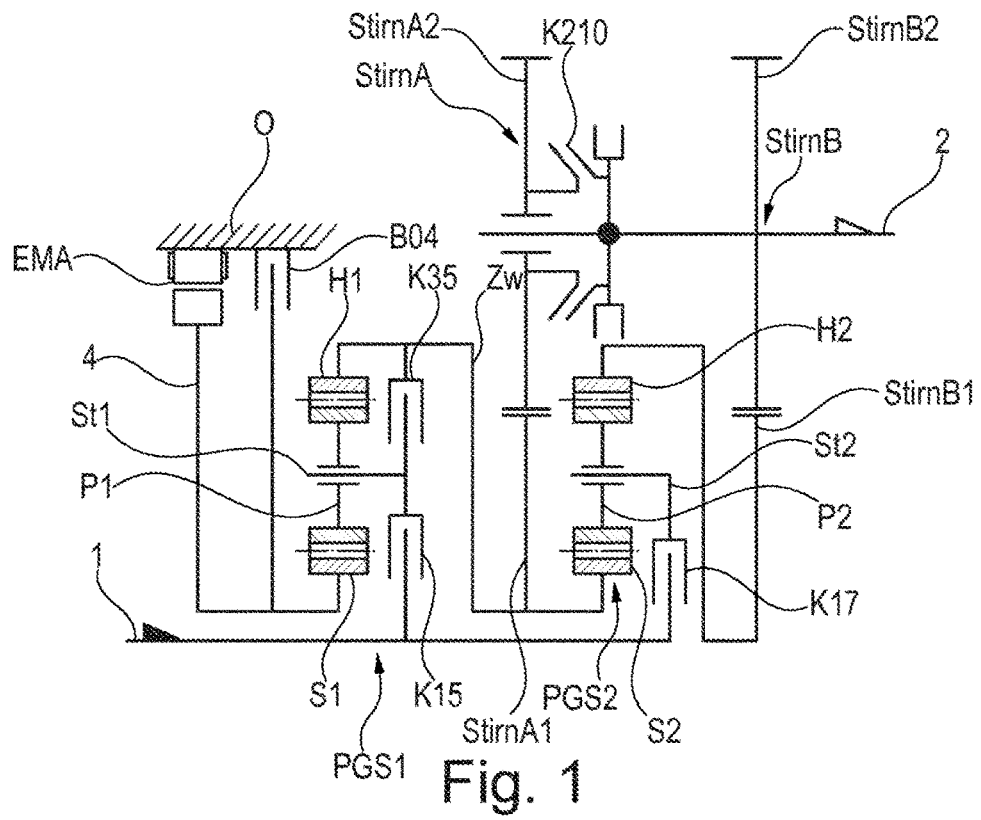
FIG. 1 is a schematized partial sectional representation of a first variant of a multistage hybrid transmission.

FIG. 1 shows a schematized partial sectional representation of a first variant of the combined multistage hybrid transmission. In the transmission housing 0, the transmission input shaft 1 and the transmission output shaft 2 are rotatably mounted. Owing to the plurality of torque transmission arrangements, comprising the couplings K15, K17, K35, K210 and the brake B04, six transmission stages are selectively shiftable for forward driving. One possible shifting diagram for such a combined multistage hybrid transmission is shown in FIG. 7.

An internal combustion engine can be coupled to the transmission input shaft 1, being designed to provide a traction power in order to overcome driving resistances of the hybrid vehicle in which this combined multistage hybrid transmission is used. As an additional drive machine, the electromechanical energy converter EMA is provided, having a drive shaft 4 to deliver and receive traction power. The electromechanical energy converter EMA is designed as an electric motor/generator. The drive shaft 4 is rotationally fixed to the sun pinion S1 of the first planetary gear set PGS1. By means of the first brake B04, the drive shaft 4 is selectively connectible to the transmission housing 0.

The first sun pinion S1 meshes with the first planetary gear P1, which is rotatably mounted on the first carrier shaft St1. Further, the first planetary gear P1 meshes with the first ring gear H1.

The second sun pinion S2 meshes with the second planetary gear P2, which is rotatably mounted on the second carrier shaft St2. Further, the second planetary gear P2 meshes with the second ring gear H2.

The planetary gear sets PGS1, PGS2 each have a plurality of planetary gears P1 and P2, only a single one of each being shown.

The first ring gear H1 is rotationally fixed to the intermediate shaft Zw and this in turn is rotationally fixed to the second sun pinion S2.

With the first coupling K15, the first carrier shaft St1 is selectively connectible in a rotationally fixed manner to the transmission input shaft 1 and with the fourth coupling K35 the first carrier shaft St1 is selectively connectible in a rotationally fixed manner to the first ring gear H1. Once the rotationally fixed connection has been made between the first carrier shaft St1 and the ring gear H1 in the first planetary gear set PGS1, traction power can be transmitted with this planetary gear set with no rolling power losses, since this moves in "blocked" manner (no rolling-off movement).

The carrier shaft St2 of the second planetary gear set PGS2, on which the planetary gear P2 is rotatably mounted, is furthermore selectively connectible in a rotationally fixed manner by means of the second coupling K17 to the transmission input shaft 1.

The first transmission input spur gear StirnA1 is rotationally fixed to the intermediate shaft Zw. The first transmission input spur gear StirnA1 forms with the first transmission output spur gear StirnA2 the first spur gear stage StirnA, by which traction power can be transmitted from the two planetary gear sets PGS1, PGS2 and thus from the transmission input shaft 1 to the transmission output shaft 2.

Further, the combined multistage hybrid transmission comprises the second spur gear stage StirnB with the second transmission input spur gear StirnB1 and the second transmission output spur gear StirnB2. The second transmission output spur gear StirnB2 is rotationally fixed to the transmission output shaft 2. The second transmission input spur gear StirnB1 is rotationally fixed to the second ring gear H2.

On the transmission output shaft 2 is arranged the sixth coupling K210. The sixth coupling K210 is designed to selectively connect the first transmission output spur gear StirnA2 in a rotationally fixed manner to the transmission output shaft 2.

Studies have shown that with such an embodiment of the combined multistage hybrid transmission a sufficient number of forward gears, in the present case six gears, can be produced with good efficiency in a small design space.

Figure 2:
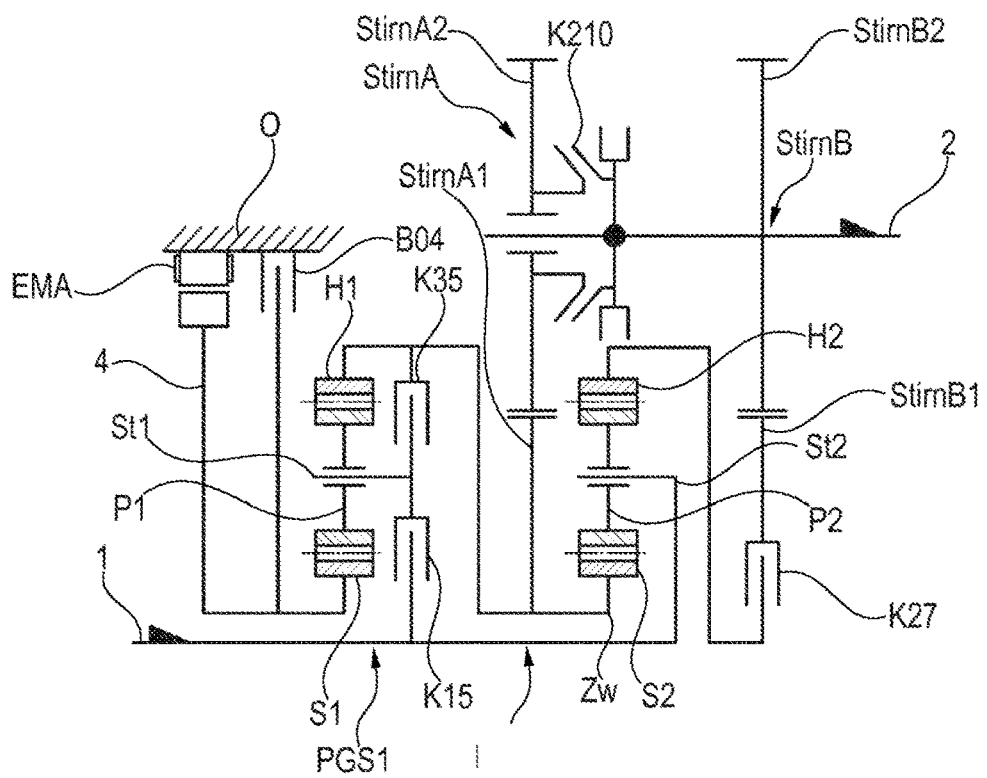
FIG. 2 is a schematized partial sectional representation of a second variant of a multistage hybrid transmission.

As regards FIG. 2, the following shall basically discuss the differences from the embodiment of the multistage hybrid transmission shown in FIG. 1. In particular, the "front part" of the multistage hybrid transmission, i.e., the arrangement of the transmission input shaft 1, the electromechanical energy converter EMA, the couplings K35 and K15, is at least similar or identical in the embodiments of the combined multistage hybrid transmission represented in FIGS. 1 to 6. The four embodiments of the multistage hybrid transmission differ basically in the configuration of the first and second spur gear stage StirnA and StirnB.

In the embodiment of the multistage hybrid transmission shown in FIG. 2, the third coupling K27 is provided instead of the second coupling K17. Due to the plurality of torque transmission arrangements in this embodiment, which encompasses the couplings K15, K27, K35, K210 and the brake B04, six transmission stages are selectively switchable for forward driving.

The first transmission input spur gear StirnA1 is rotationally fixed to the intermediate shaft Zw and the second transmission output spur gear StirnB2 is rotationally fixed to the transmission output shaft 2. With the third coupling K27, the torque transmission between the second ring gear H2 and the second transmission input spur gear StirnB1 can be selectively interrupted.

Figure 3:
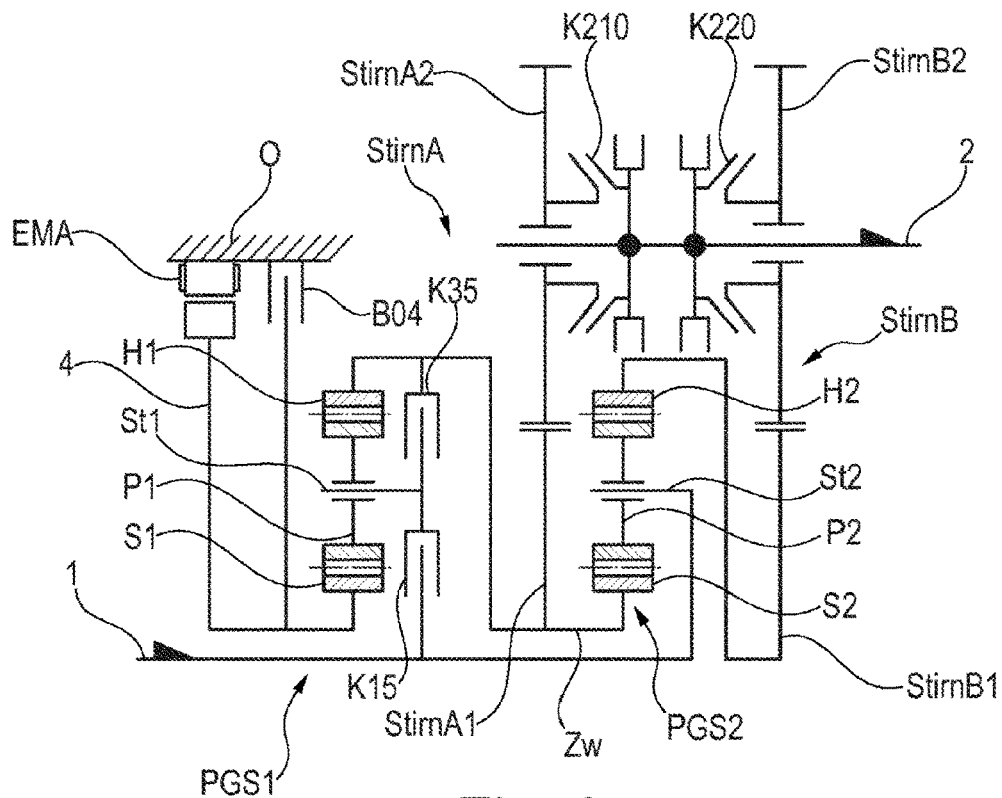
FIG. 3 is a schematized partial sectional representation of a third variant of a multistage hybrid transmission.

The following, with regard to the embodiment of the combined multistage hybrid transmission represented in FIG. 3, shall basically discuss the differences from the embodiment represented in FIG. 1. In particular, the "front part" of the multistage hybrid transmission, i.e., the arrangement of the transmission input shaft 1, the electromechanical energy converter EMA, the couplings K35 and K15, is at least similar or identical in the embodiments of the multistage hybrid transmission represented in FIGS. 1 to 6.

In the embodiment of the multistage hybrid transmission shown in FIG. 3, both a sixth and a seventh coupling K210, K220 are provided and the layout in the area of the first and second planetary gear sets PGS1, PGS2 is accordingly simplified. Due to the plurality of torque transmission arrangements in this embodiment, which encompasses the couplings K15, K35, K210, K220 and the brake B04, six transmission stages are selectively switchable for forward driving.

Instead of the second coupling K17 (FIG. 1) or the third coupling K27 (FIG. 2) there are provided the sixth and seventh coupling K210, K220. The second ring gear H2 is rotationally fixed to the second transmission input spur gear StirnB1 and the first transmission input spur gear StirnA1 is rotationally fixed to the intermediate shaft Zw. With the sixth coupling K210, the first transmission output spur gear StirnA2 is selectively connectible in a rotationally fixed manner to the transmission output shaft 2 and by the seventh coupling K220 the second transmission output spur gear StirnB2 is selectively connectible in a rotationally fixed manner to the transmission output shaft 2. With such a configuration, an especially simple layout is achieved for the transmission in the area of the first and second planetary gear sets PGS1 and PGS2 and thus six selectively switchable forward gears are also produced by means of five torque transmission arrangements in this combined multistage hybrid transmission.

Figure 4:
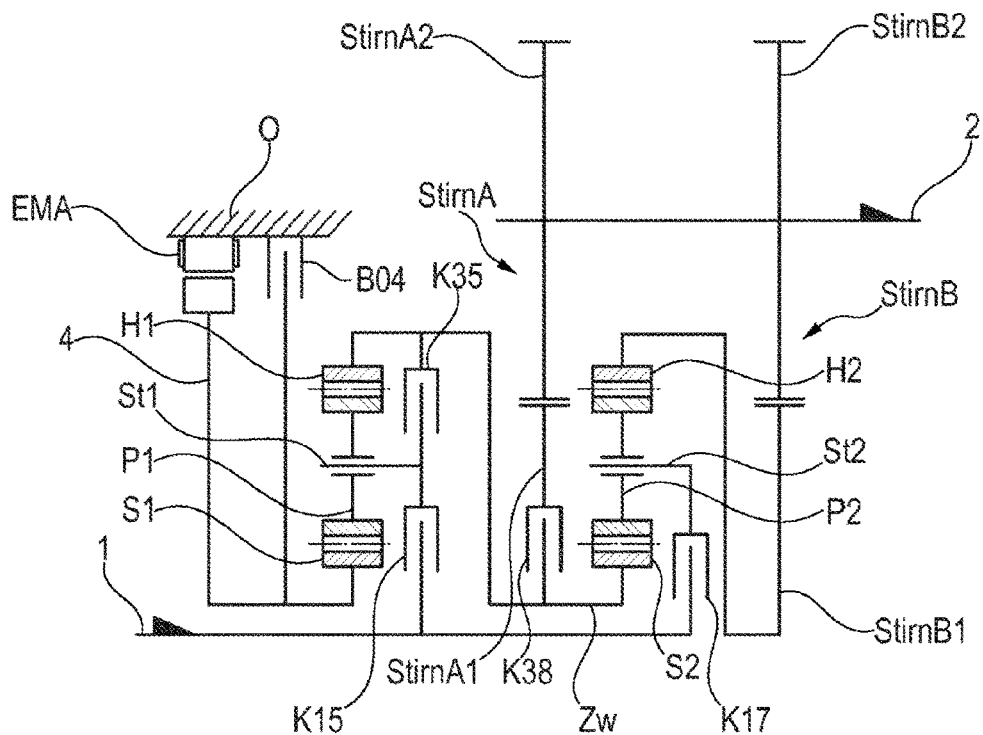
FIG. 4 is a schematized partial sectional representation of a fourth variant of a multistage hybrid transmission.

The following, with regard to the embodiment of the combined multistage hybrid transmission represented in FIG. 4, shall basically discuss the differences from the embodiment represented in FIG. 1. In particular, the "front part" of the multistage hybrid transmission, i.e., the arrangement of the transmission input shaft 1, the electromechanical energy converter EMA, the couplings K35 and K15, is at least similar or identical in the embodiments of the multistage hybrid transmission represented in FIGS. 1 to 6.

In the embodiment of the combined multistage hybrid transmission shown in FIG. 4, both the first and the second transmission output spur gear StirnA2, StirnB2 are rotationally fixed to the transmission output shaft 2. Due to the plurality of torque transmission arrangements in this embodiment, which encompasses the couplings K15, K17, K35, K38 and the brake B04, six transmission stages are selectively switchable for forward driving.

The first transmission input spur gear StirnA1 is selectively connectible in a rotationally fixed manner to the intermediate shaft Zw by means of the fifth coupling K38. The second carrier shaft St2 is selectively connectible in a rotationally fixed manner to the transmission input shaft 1 by means of the second coupling K17. The second ring gear H2 is rotationally fixed to the second transmission output spur gear StirnB1. With such a configuration, an especially simple layout is achieved for the transmission in the area of the transmission output shaft 2 and thus six forward gears are also produced by means of five torque transmission arrangements in this combined multistage hybrid transmission.

Figure 5:
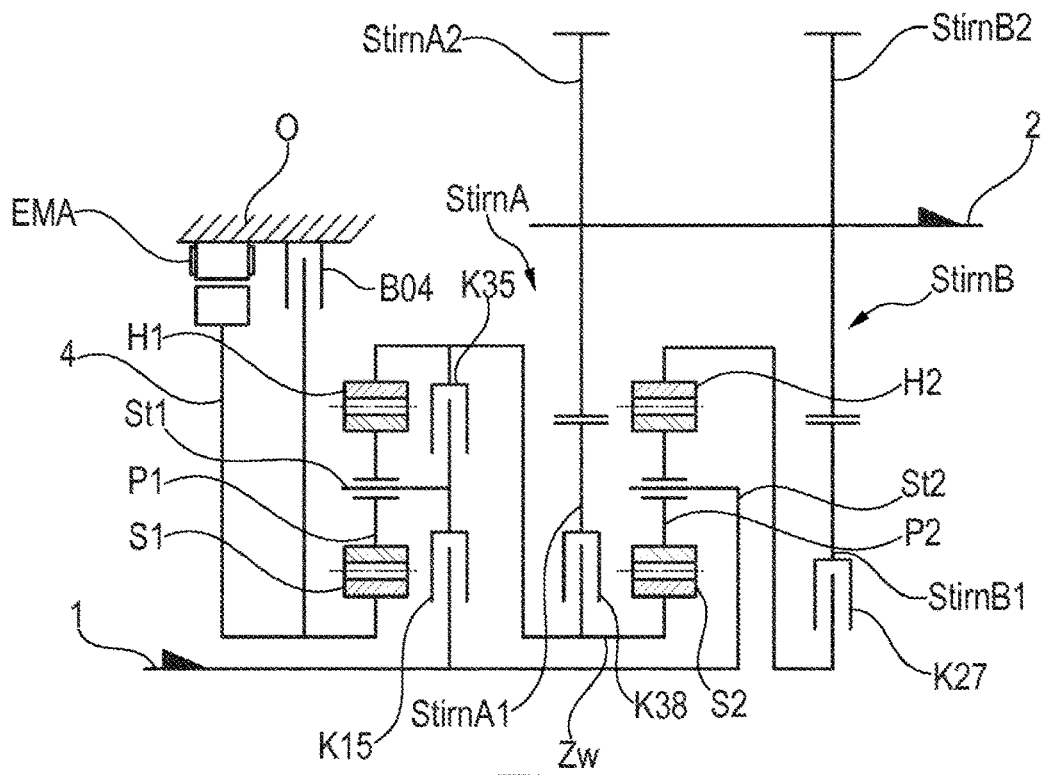
FIG. 5 is a schematized partial sectional representation of a fifth variant of a multistage hybrid transmission.

FIG. 5 shows an embodiment of the combined multistage hybrid transmission which is similar to the embodiment of the invention shown in FIG. 4. By contrast with the embodiment shown in FIG. 4, no second coupling K17 is present here, having been replaced by the third coupling K27. By means of the third coupling K27, the second transmission input spur gear StirnB1 is selectively connectible in a rotationally fixed manner to the second ring gear H2. The second carrier shaft St2, on the other hand, is rotationally fixed to the transmission input shaft 1. In particular, with such a configuration the actuation of the third coupling K27 is especially simple, since this is arranged on the outside, unlike for example the second coupling K17 (FIG. 4).

Figure 6:
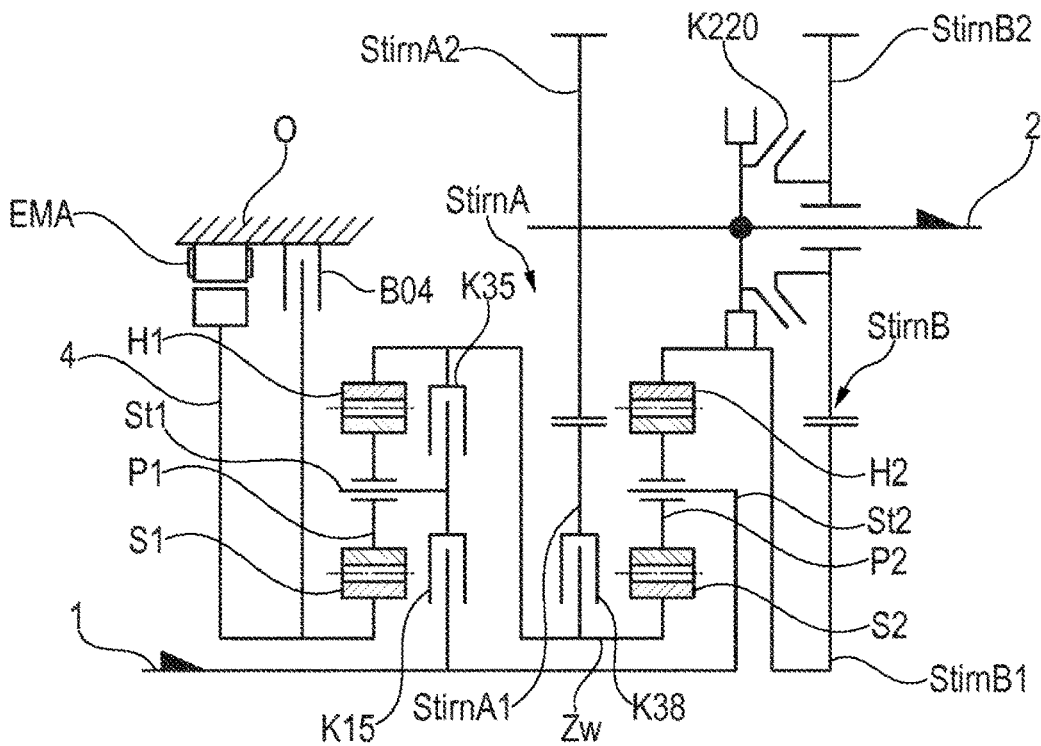
FIG. 6 is a schematized partial sectional representation of a sixth variant of a multistage hybrid transmission.

FIG. 6 shows an embodiment of the combined multistage hybrid transmission which is similar to the embodiment of the invention shown in FIG. 3. By contrast with the embodiment shown in FIG. 3, the first transmission output spur gear StirnA2 is rotationally fixed to the transmission output shaft. Further, the fifth coupling K38 is provided, with which the first transmission input spur gear StirnA1 is selectively connectible in a rotationally fixed manner to the intermediate shaft Zw. Further, there is no sixth coupling K210 provided in the embodiment shown in FIG. 6. In particular, by means of such a configuration, the couplings K220 and K38 are distributed among the transmission input shaft 1 and the intermediate shaft Zw and the transmission output shaft 2 and thus an especially compact transmission can be produced.

FIG. 7 shows a shifting diagram for the six forward gears of the combined multistage hybrid transmission according to one of the represented multistage hybrid transmissions (FIGS. 1 to 6). It can be seen that precisely three torque transmission arrangements are activated or closed for one gear according to the shifting diagram. Closed means in this regard that a torque can be transmitted by means of this torque transmission arrangement, such a torque transmission arrangement being designated by "X". Further, it has proven to be favorable in the proposed shifting diagram that two torque transmission arrangements remain in the closed state for every gear change from one gear to another adjacent gear (n to n−1 or n to n+1) and only one torque transmission arrangement is opened and another one is closed in its stead, which thus produces a good controllability of the gear shifting, which is especially made possible by the proposed architecture of the combined multistage hybrid transmission.

LIST OF REFERENCES 0 transmission housing
1 transmission input shaft
2 transmission output shaft
4 drive shaft of EMA
Zw intermediate shaft
PGS1 first planetary gear set
S1 first sun pinion
St1 first carrier shaft
H1 first ring gear
P1 first planetary gear
PGS2 second planetary gear set
S2 second sun pinion
St2 second carrier shaft
H2 second ring gear
P2 second planetary gear
B04 brake
K15, K17, K27, K35, K38, K210, couplings K220
StirnA, StirnB first, second spur gear stage
StirnA1, StirnB1 first, second transmission input spur gear
StirnA2, StirnB2 first, second transmission output spur gear The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A combined multistage hybrid transmission, comprising:
   a transmission housing;
   a transmission input shaft and a transmission output shaft;
   at least one first planetary gear set with a first sun pinion, a first ring gear and a first carrier shaft on which at least one first planetary gear is rotatably mounted;
   a second planetary gear set with a second sun pinion, a second ring gear and a second carrier shaft on which at least one second planetary gear is rotatably mounted;
   a fourth coupling; and
   an electromechanical energy converter which is rotationally fixed to the first sun pinion,
   wherein
      the first ring gear is rotationally fixed to the second sun pinion by an intermediate shaft,
      the transmission output shaft is arranged axially parallel and at a radial distance to the transmission input shaft,
      drive power from the transmission input shaft is transmittable by way of a first spur gear stage with a first transmission input spur gear and a first transmission output spur gear and with a second spur gear stage having a second transmission input spur gear and a second transmission output spur gear,
      the first and second transmission output spur gears are concentric to the transmission output shaft and the first and second transmission input spur gears are concentric to the transmission input shaft,
      the first transmission input spur gear is rotationally fixable to the intermediate shaft, and the second transmission input spur gear is rotationally fixable to the second ring gear, and
      the first carrier shaft is selectively connectible in a rotationally fixed manner by the fourth coupling to the intermediate shaft.

2. The combined multistage hybrid transmission according to claim 1, further comprising:
   a first coupling, wherein
      the transmission input shaft is selectively connectible in a rotationally fixed manner by the first coupling to the first carrier shaft.

3. The combined multistage hybrid transmission according to claim 1, wherein
   the first transmission output spur gear is rotationally fixed to the transmission output shaft.

4. The combined multistage hybrid transmission according to claim 3, wherein
   the first transmission input spur gear is selectively connectible in a rotationally fixed manner by a fifth coupling to the intermediate shaft.

5. The combined multistage hybrid transmission according to claim 1, wherein
the first transmission output spur gear is selectively connectible in a rotationally fixed manner by a sixth coupling to the transmission output shaft and the first transmission input spur gear is rotationally fixed to the intermediate shaft.

6. The combined multistage hybrid transmission according to claim 5, wherein
the second transmission output spur gear is rotationally fixed to the transmission output shaft.

7. The combined multistage hybrid transmission according to claim 6, wherein
a single one of two selectively shiftable couplings is provided, said two couplings comprise a second coupling and a third coupling, wherein
the second carrier shaft is connectible in a rotationally fixed manner by the second coupling to the transmission input shaft and the second transmission input spur gear is connectible in a rotationally fixed manner by the third coupling to the second ring gear.

8. The combined multistage hybrid transmission according to claim 7, wherein the second coupling is provided, and
the second transmission input spur gear is rotationally fixed to the second ring gear.

9. The combined multistage hybrid transmission according to claim 5, wherein
the second transmission output spur gear is selectively connectible in a rotationally fixed manner by a seventh coupling to the transmission output shaft and the second transmission input spur gear is rotationally fixed to the second ring gear.

10. The combined multistage hybrid transmission according to claim 9, wherein
at least one of the two couplings, the sixth coupling and the seventh coupling, is designed as a frictional form-fitting coupling, or both the sixth and seventh couplings are so designed.

11. The combined multistage hybrid transmission according to claim 1, wherein the first sun pinion is connectible in a rotationally fixed manner to the transmission housing by a first selectively shiftable brake.

12. The combined multistage hybrid transmission according to claim 1, wherein
the second carrier shaft is permanently rotationally fixed to the transmission input shaft.

13. A power train for a hybrid vehicle comprising:
a combined multistage hybrid transmission according to claim 1;
an internal combustion engine, which is configured to transmit power to the transmission input shaft and which is connectible to the transmission input shaft at least temporarily, and
a drive train, which is configured to transmit power from the transmission output shaft to at least one powered wheel and which is connectible to the transmission output shaft at least temporarily.

* * * * *